US006128615A

United States Patent [19]

Molloy

[11] Patent Number: 6,128,615

[45] **Date of Patent: *Oct. 3, 2000**

[54] PROCESS-PAIR RESOURCE MANAGER IMPLEMENTATION OF OBJECT BAGS

[75] Inventor: Mark E. Molloy, San Jose, Calif.

[73] Assignee: Compaq Computer Corporation, Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/877,529

[22] Filed: Jun. 17, 1997

Related U.S. Application Data

[63] Continuation of application No. 08/877,529, Jun. 17, 1997.

[51] Int. Cl.[7] .......... G06F 9/00

[52] U.S. Cl. .......... 707/8; 707/103

[58] Field of Search .......... 707/1–205

[56] References Cited

U.S. PATENT DOCUMENTS

| | | | |
|---|---|---|---|
| 5,568,639 | 10/1996 | Wilcox | 707/1 |
| 5,586,039 | 12/1996 | Hirsh et al. | 364/468.1 |
| 5,596,745 | 1/1997 | Lai et al. | 707/103 |
| 5,613,060 | 3/1997 | Britton . | |
| 5,701,480 | 12/1997 | Raz . | |
| 5,720,018 | 2/1998 | Muller . | |
| 5,765,176 | 6/1998 | Bloomberg . | |
| 5,815,689 | 9/1998 | Shaw . | |
| 5,828,384 | 10/1998 | Iwasaki . | |
| 5,835,764 | 11/1998 | Platt . | |

*Primary Examiner*—Paul R. Lintz
*Assistant Examiner*—John Gladstone Mills, III
*Attorney, Agent, or Firm*—Fenwick & West LLP

[57] ABSTRACT

A shared bag, for collecting objects used in object oriented programming, implemented as a process pair resource manager intended to provide concurrent access to multiple threads. The process-pair implementation includes a concurrent aspect and a serial aspect. Each thread gains concurrent access to the shared bag through a registered transaction. The multiple threads can concurrently access the shared bag by passing messages to the concurrent aspect in order to add objects to, or remove objects from the shared bag. The concurrent aspect adds a description of each message, as well as the result of processing each message, to a transaction record associated with the transaction under which the thread is registered. The identity of each removed object is also recorded by the concurrent aspect in the transaction record. At the conclusion of a transaction, the concurrent aspect passes the transaction record to the serial aspect. The serial aspect then replays the transaction, using the transaction record. The serial aspect uses the object identities included in the transaction record to deterministically choose the order in which objects are removed during a transaction. Once the serial aspect has replayed the entire record, it commits or rolls back the transaction. In the event of process, processor, communication, or system failure, the shared bag is always recoverable to reflect all, and only, committed transactions.

33 Claims, 5 Drawing Sheets

PROCESS-PAIR RESOURCE MANAGER IMPLEMENTATION OF OBJECT BAGS

RELATED APPLICATIONS

This application is a continuation of copending application Ser. No. 08/877,529, filed on Jun. 17, 1997. The subject matter of this application is related to U.S. application Ser. No. 08/840,749 entitled "Using Process-Pairs as Transaction-Coordinated Resource Managers" by Mark Edward Molloy, filed on Apr. 16, 1997. The disclosure set forth in U.S. application Ser. No. 08/840,749 is herein expressly incorporated by reference into this application.

FIELD OF THE INVENTION

The present invention relates generally to object-oriented and transaction processing computer systems. More specifically, the present invention is a method and apparatus for providing concurrent access to an object bag using a process-pair resource manager.

BACKGROUND OF THE INVENTION

Objects, as used in the context of object-oriented programming, are programmatic combinations of data elements and methods. Each data element or method included in an object is either public or private. Public data elements and methods may be manipulated by entities that are external to the object. Private data elements and methods, on the other hand, are encapsulated and may only be manipulated by the object itself. In practice, a typical object includes some number of private data elements and some number of public methods for manipulating the private data elements.

Collection objects are used to organize collections of objects. Bags, a type of collection object, are so-named because their function is similar to real bags or sacks. Thus, programs put objects into bags and remove objects from bags. An object may be in a bag multiple times. This makes bags different than sets (another type of collection object) because an object is either in, or not in, a set. Bags are unlike arrays because the objects in a bag are not accessible using an index or key. Bags are also unlike queues or stacks because the order in which objects come out of a bag bears no defined relation to the order in which the objects went in to the bag.

In practice, the bag has been found to be a useful programming abstraction. This usefulness is enhanced if the bag is implemented as a transaction-protected resource. To understand the nature of transaction-protected resources and the usefulness of bags as transaction-protected resources, it is helpful to first understand the transaction abstraction. Fundamentally, a transaction is defined as a unit of work that is 1) "atomic," 2) "consistent," 3) "isolated," and 4) "durable" (more commonly, it is said that transactions have "ACID" properties).

To be "atomic" a transaction must complete in an all-or-none fashion. This means that transaction-protected resources must reflect all changes made during a transaction that successfully completes or "commits." It also means that transaction-protected resources must reflect none of the changes made during a transaction that fails to commit for any reason.

To be "consistent" a transaction must move transaction-protected resources from one consistent state to another. In systems that use the transaction abstraction, consistent states are defined in terms of rules known as integrity constraints. Transactions that violate these integrity constraints are aborted. In this way, transaction-protected resources are maintained in consistent states. For example, in a product inventory database, an integrity constraint could be used to abort any transaction that would result in a negative quantity of any product.

To be "isolated" the changes made to transaction protected resources must be invisible to threads and processes that are not associated with the transaction until the transaction has committed. Typically, isolation is achieved by locking the changed resource, forcing threads and processes that attempt to read the locked resource to wait until the transaction has completed.

Finally, to be "durable" the changes made to transaction-protected resources must not be lost or corrupted, even in the case of a catastrophic system failure. In this context, durability is not used in the absolute sense. For example, physically destroying the transaction processing computer system and all of its backup records will violate the durability property.

The implementation of bags as transaction-protected resources enhances the reliability of the bag objects and the overall reliability of the system using the bag objects. Unfortunately, in traditional implementations, ACID properties are ensured by limiting access to transaction protected resources to a single transaction at a time. Thus, only a single process or thread may access a particular bag at a particular time. It is easily appreciated, however, that the usefulness of an object, such as a bag, is greatly enhanced if it can participate in concurrent transactions. Specifically, provision of concurrent access ensures that the bag does not become a barrier that forces multiple processes to serialize. Thus, a need exists for a bag implementation that acts as a transaction-protected resource and still provides concurrent access to processes or thread.

SUMMARY OF THE INVENTION

The present invention includes a shared bag implemented as a transaction-protected resource manager. More specifically, the shared bag of the present invention is constructed as a process-pair resource manager having a serial aspect and a concurrent aspect. The serial aspect and the concurrent aspect are actually processes that are instances of the same program—they execute subsets of the same program instructions. After initialization, however, the serial aspect and the concurrent aspect assume different functional roles. The shared bag of the present invention also includes a durable image of the serial aspect in some between-transaction state; it does not have to be up-to-date. The durable image is known as a "passivated image," and may be used to reconstruct the serial aspect in a known state. The shared bag also includes a durable transaction record log, also used for reconstruction of the serial aspect, with the resulting reconstruction reflecting all committed transactions, and only committed transactions.

The concurrent aspect and serial aspect of the shared bag encapsulate properties that include a list of objects contained in the shared bag, and two per-transactions lists. The first per-transaction list includes each object that has been added to the shared bag during a particular transaction but not subsequently removed. The second per-transaction list includes each object that has been removed from the shared bag during a particular transaction, excepting those that were previously added during the same transaction. In combination with the encapsulated properties, the concurrent and serial aspects of the shared bag support public methods to put objects in the shared bag and to remove objects from the shared bag.

Each thread or process that requires access to the shared bag does so as part of a transaction. Therefore, prior to accessing the shared bag, threads and processes initiate transactions by sending begin transaction messages to a transaction manager. Subsequently, the threads or processes access the shared bag by sending request messages to the concurrent aspect to put objects in or remove object from the shared bag. In response, the concurrent aspect sends reply messages back to the threads or processes.

When a process requests that an object be added to the shared bag, the concurrent aspect first checks to see if the same object is included in the relevant per-transaction list of removed objects. If so, the object is removed from the per-transaction list of removed objects, and returned to the shared list of objects contained by the bag. Otherwise, the object is added to the relevant per-transaction list of added objects, but it is not added to the shared list of objects contained by the bag.

When a process requests an object from the shared bag, the concurrent aspect first checks to see if relevant per-transaction list of added objects is non-empty. If so, an object is removed from the per-transaction list of added objects and returned to the calling process. Otherwise, if the shared bag's shared list of contained objects is not empty, an object is removed from the shared list and added to the relevant list of removed objects. In cases where the shared bag's list of contained objects is empty, a NULL value is returned.

The concurrent aspect constructs a transaction record for each transaction in which the shared bag participates. The transaction record for a transaction includes each request message received by the concurrent aspect and each reply message sent by the concurrent aspect during a particular transaction. The concurrent aspect also adds the identity of each object removed from the bag in the transaction record for the relevant transaction. The concurrent aspect responds to the first message received during a particular transaction by sending a message to the transaction manager, causing the transaction manager to register the shared bag as a participant in that transaction.

As a transaction participant, the concurrent aspect is a recipient of the prepare, commit and rollback messages that are associated with transaction completion. To respond to a prepare message, the concurrent aspect sends the transaction record for the relevant transaction to the serial aspect. The serial aspect then replays the transaction using the transaction record. During the replay, the serial aspect uses the object identities recorded in the transaction record to determine which object is to be removed for each remove operation. At the conclusion of the replay, the serial aspect moves all objects in the relevant list of added objects to the shared bag's list of contained objects. The serial aspect then sends a message to the concurrent aspect informing the concurrent aspect that the serial aspect has committed the transaction. In response, the concurrent aspect sends a message to the transaction manager voting to commit the transaction.

To respond to a commit message, the concurrent aspect replicates the "commit" portion of the processing already performed by the serial aspect in response to the prepare message. That is, the serial aspect moves all objects in the relevant list of added objects to the shared bag's list of contained objects.

To respond to a rollback message, the concurrent aspect moves all objects in the relevant list of removed objects to the shared bag's list of contained objects. The list of added objects for the same transaction is discarded.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

ENVIRONMENT

Figure 1:
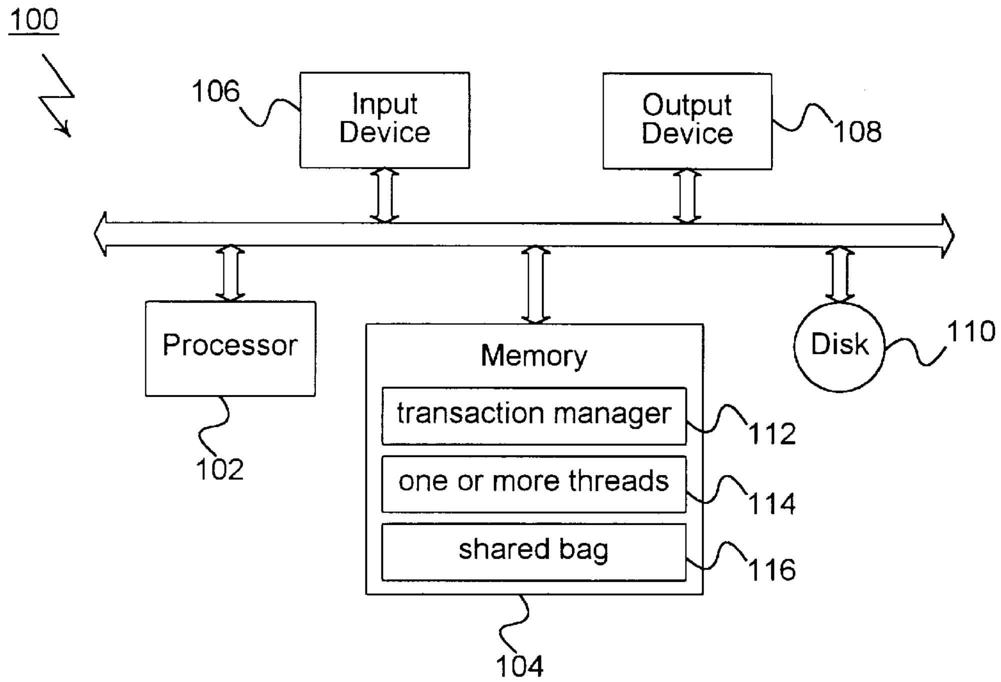
FIG. 1 is a block diagram of a host computer system in accordance with an embodiment of the present invention.

In FIG. 1, a host computer system 100 is shown as a representative environment for the shared bag of the present invention. Structurally, host computer system 100 includes a processor or processors 102, and a memory 104. An input device 106 and output device 108 are connected to processor 102 and memory 104. Input device 106 and an output device 108 represent a wide range of varying I/O devices such as disk drives, keyboards, modems, network adapters, printers and displays. Host computer system 100 also includes a disk drive 110 of any suitable disk drive type (equivalently, disk drive 110 may be any non-volatile storage system such as "flash" memory). A transaction manager 112, and one or more threads 114 are shown to be resident in memory 104 of host computer 100.

SHARED BAG

Figure 2:
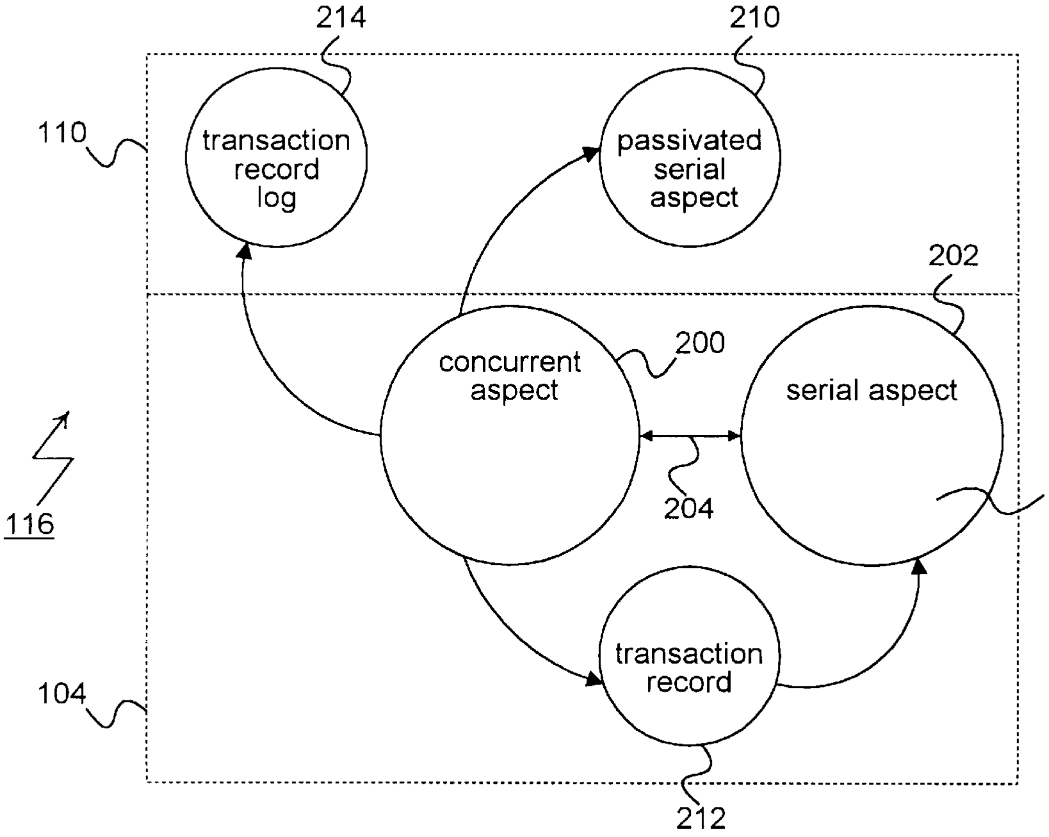
FIG. 2 is a block diagram of a shared bag in accordance with an embodiment of the present invention.

The present invention provides a shared bag that is implemented as a process-pair resource manager. In FIG. 1, the shared bag of the present invention is shown to be resident in memory 104 of host computer 100 and is designated 116. The major structural elements of a process-pair resource manager, of the type used to implement shared bag 116, are shown in FIG. 2 to include a concurrent aspect 200, a serial aspect 202, a communications link 204, a transaction record 212, a transaction record log 214, and a passivated serial aspect 210. The details of process-pair resource managers are more completely described in a co-pending U.S. application Ser. No. 08/840,749 entitled "Using Process-pairs as Transaction-Coordinated Resource Managers" by Mark Edward Molloy, filed Apr. 16, 1997 the disclosure of which is incorporated in this document by reference.

Figure 3:
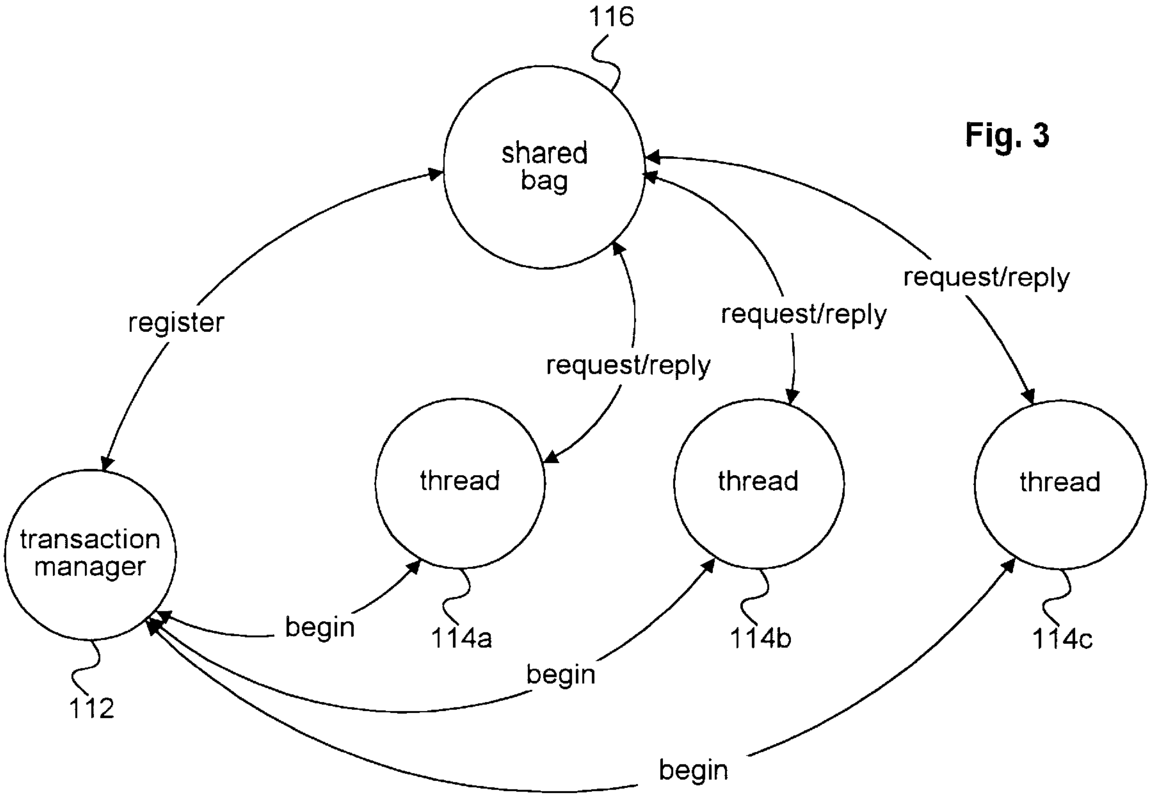
FIG. 3 is a block diagram showing the relation between the shared bag, transaction manager, and threads in accordance with an embodiment of the present invention.

As an object, shared bag 116 includes both properties and methods. To better understand the properties and methods included in shared bag 116, it is first necessary to appreciate the relationship between shared bag 116, threads 114 and transaction manager 112. More specifically, it may be appreciated that shared bag 116 is intended to provide concurrent access to multiple threads 114. This is shown more clearly in FIG. 3 where a representative shared bag 116 is shown in combination with three threads 114_a_ through 114_c_. For the purposes of the present invention, however, each thread 114 is only allowed to access shared bag 116 as part of a separate transaction. As a result, each thread 114 is required to initiate a new transaction prior to accessing shared bag 116. In FIG. 3, this is represented by threads 114 sending begin transaction messages to transaction manager 112. Subsequently, threads 114 access shared bag 116 by sending request messages to shared bag 116. These messages include requests to put objects into, and to take objects out of, shared bag 116. In response, shared bag 116 sends reply messages back to threads 114.

Figure 4:
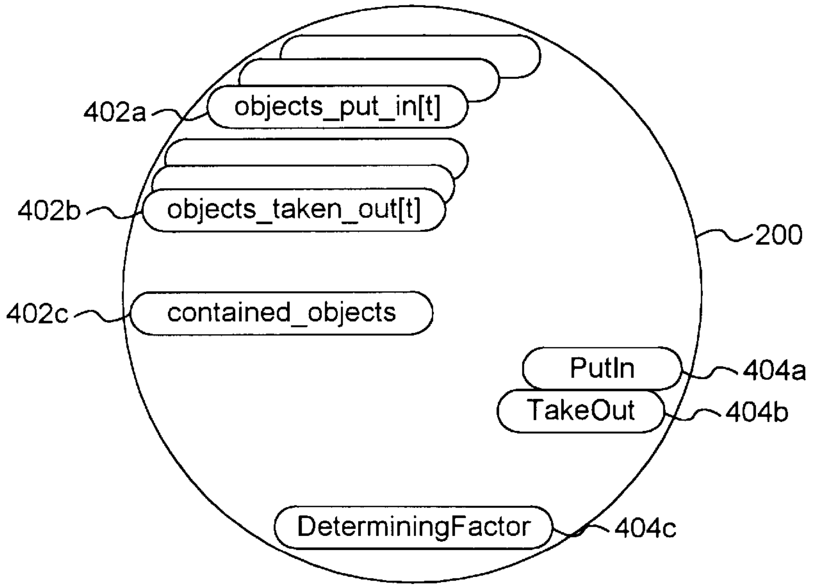
FIG. 4 is a block diagram showing the properties and methods of the shared bag in accordance with an embodiment of the present invention.

With the relationship between shared bag 116, threads 114 and transaction manager 112 in mind, the methods and properties of shared bag 116 may be explained by reference to FIG. 4. FIG. 4 shows that concurrent aspect 200 of shared bag 116 includes three properties 402_a_ through 402_c_, and three methods 404_a_ through 404_c_. The process-pair implementation of shared bag 116 means that separate copies of properties 402 and methods 404 are included in serial aspect 202. For the purposes of the immediate discussion, however, reference will be limited to concurrent aspect 200.

Figure 5:
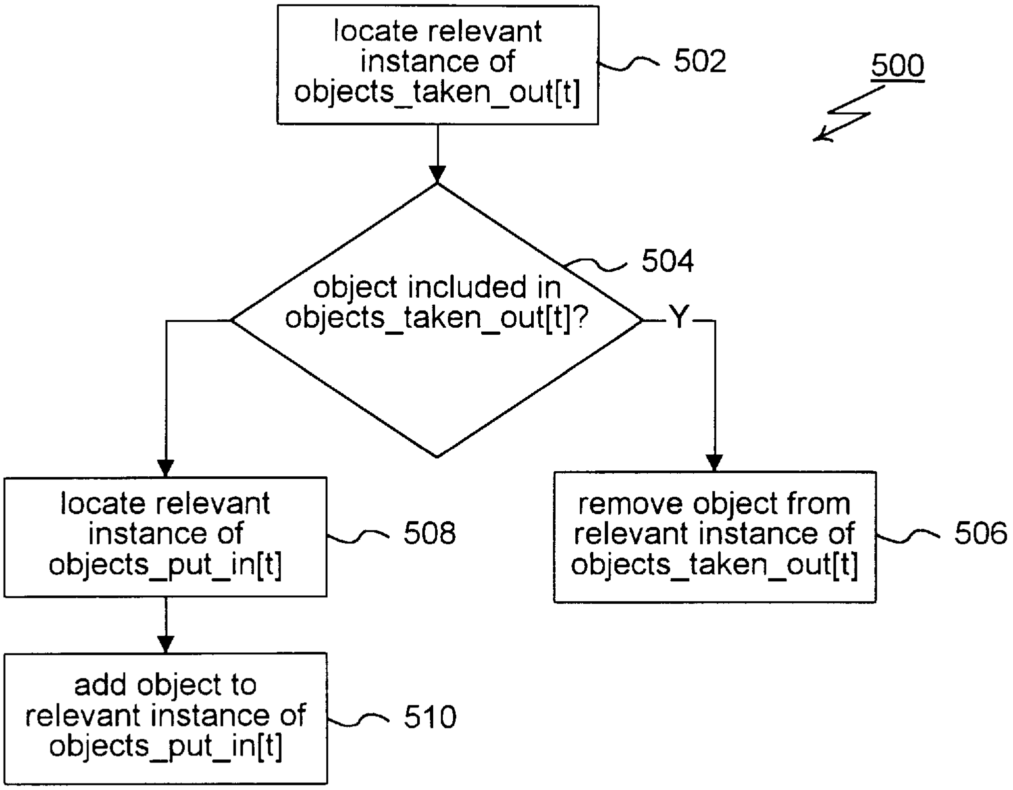
FIG. 5 is a flow chart showing the steps performed by both the concurrent aspect and the serial aspect while processing the PutIn method of an embodiment of the present invention.

Property 402_a_, objects_put_in[t], is a per-transaction list of objects that have been added to shared bag 116 (the index 't' is intended to represent a unique index associated with a particular transaction). Preferably, objects)_put_in[t] 402_a_ is initialized to be an empty list. Property 402_b_, objects_taken_out[t], is a per-transaction list of objects that have been removed from shared bag 116. Preferably, objects_taken_out[t] 402_b_ is also initialized to be an empty list. Property 402_c_, contained_objects, is the list of objects included in shared bag 116. Unlike objects_put_in[t] 402_a_ and objects_taken_out[t] 402_b_, contained_objects 402_c_ is not a per-transaction list. Contained_objects 402_c_ is preferably initialized to be an empty list Threads or processes send messages to invoke public method PutIn 404_a_ to add objects to shared bag 116. Each message of this type includes information identifying the object that is to be added. Execution of PutIn 404_a_ by concurrent aspect 200 is shown as method 500 of FIG. 5. Method 500 begins with step 502 where concurrent aspect 200 locates the instance of objects_taken_out[t] 402_b_ that corresponds to the transaction in which the calling thread or process is a participant. Concurrent aspect 200 then searches this instance of objects_taken_out[t] 402_b_ (step 504). If the object to be added is located in the search of objects_taken_out[t] 402_b_, concurrent aspect 200 removes the object from the instance of objects_taken_out[t] 402_b_ (step 506), and adds it back into the shared list contained_objects 402_c_. Alternatively, if the object to be added is not found in the instance of objects_taken_out[t] 402_b_, concurrent aspect 200 locates the instance of objects_put_in[t] 402_a_ that corresponds to the transaction in which the calling thread or process is a participant (step 508). Concurrent aspect 200 then adds the object to this instance of objects_put_in[t] 402_a_ (step 510). It is important to note that in this latter case the object to be added is not added to contained_objects 402_c_ during the invocation of PutIn 404_a_.

Figure 6:
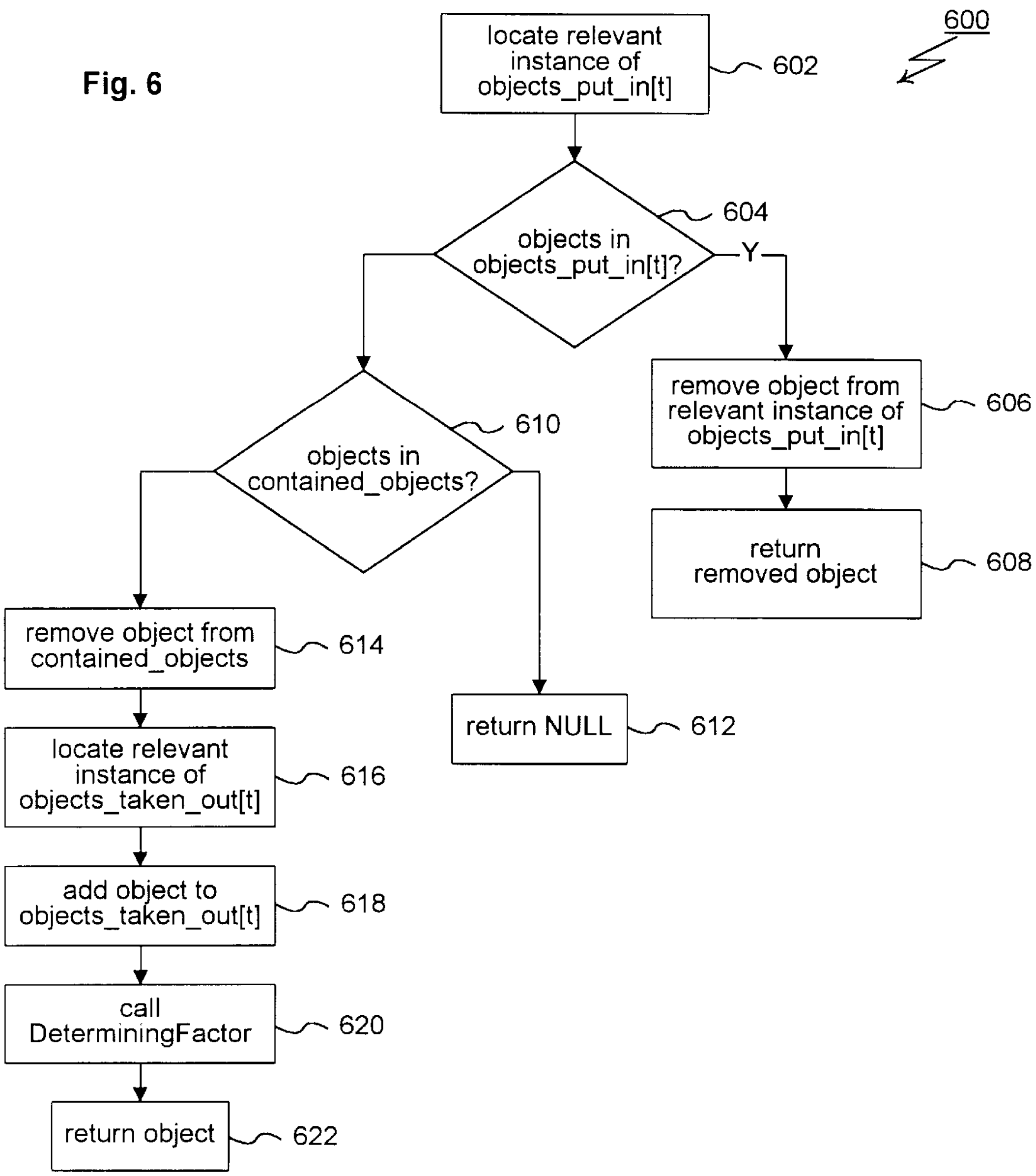
FIG. 6 is a flow chart showing the steps performed by the concurrent aspect while processing the TakeOut method of an embodiment of the present invention.

Threads or processes send messages to invoke public method TakeOut 404_b_ to remove objects from shared bag 116. Execution of TakeOut 404_b_ by concurrent aspect 200 is shown as method 600 of FIG. 6. Method 600 begins with step 602 where concurrent aspect 200 locates the instance of objects_put_in[t] 402_a_ that corresponds to the transaction in which the calling thread or process is a participant. Concurrent aspect 200 then determines if there are any objects in the relevant instance of objects_put_in[t] 402_a_ (step 604). If objects_put_in[t] 402_a_ is not empty, concurrent aspect 200 removes an object from objects_put_in[t] 402_a_ (step 606) and returns that object to the calling thread or process (step 608).

Alternatively, if the relevant instance of objects_put_in [t] 402_a_ is empty, concurrent aspect 200 examines contained_objects 402_c_ (step 610). If contained_objects 402_c_ is empty, concurrent aspect 200 returns a value of NULL for the return value of TakeOut 404_b_ (step 612). If contained_objects 402_c_ is not empty, concurrent aspect 200 removes an object from contained_objects 402_c_ (step 614). Concurrent aspect 200 then locates the instance of objects_taken_out[t] 402_b_ that corresponds to the transaction in which the calling thread or process is a participant (step 616). The removed object is then added to the instance of objects_taken_out[t] 402_b_ located in step 616 (step 618). After adding the object to objects_taken_out[t] 402_b_, concurrent aspect 200 calls DeterminingFactor 404_c_ passing the identity of the removed object as an argument (step 620). The function of DeterminingFactor 404_c_ will be described below. Concurrent aspect 200 then returns the removed object as the return value of TakeOut 404_b_ (step 622).

DeterminingFactor 404_c_ is a private method used internally within shared bag 116. DeterminingFactor 404_c_ takes, as an argument, information that identifies an object. As previously described, DeterminingFactor 404_c_ is called by concurrent aspect 200 during an invocation of TakeOut 404_b_ (see step 620 of method 600). Thus, DeterminingFactor 404_c_ is called when a thread or process is removing an object from shared bag 116. When called, DeterminingFactor 404_c_ adds an identifier corresponding to its argument object to the current transaction record 212 (i.e., the transaction record 212 associated with the transaction in which the thread or process calling TakeOut 404_b_ is a participant). As a result, by calling DeterminingFactor 404_c_, transaction record 212 of the current transaction is modified to include the identity of the object that is actually being removed from shared bag 116 by TakeOut 404_b_.

To understand the significance of DeterminingFactor 404_c_, it is first necessary to appreciate the non-deterministic nature of TakeOut 404_c_. More specifically, due to the definition of the bag abstraction, it may be recalled that the order in which objects are taken out of a bag bears no defined relation to the order in which the objects were put into the bag. Thus, by definition, the identity of the object returned by a call to TakeOut 404_c_ is non-deterministic. The nature of process-pair resource managers, however, requires that each transaction performed by concurrent aspect 200 be replayed by serial aspect 202. The replay performed by serial aspect 202 must be deterministic. Otherwise, serial aspect 202 will remove objects from shared bag 116 in a different order than concurrent aspect 200. Thus, the transaction replay performed by serial aspect 202 may not match transaction record 212 created by concurrent aspect 200 and the transaction may unnecessarily rollback. To avoid this situation, DeterminingFactor 404*c* records the identity of objects removed from shared bag 116 in transaction record 212. During the corresponding replay, serial aspect 202 uses the recorded identity to deterministically select the appropriate object to remove from shared bag 116.

In practice, a shared bag 116 will interact with one or more threads or processes 114 in a series of one or more transactions. Each of these transactions will end when the initiating thread or process instructs transaction manager 112 to either commit or rollback the transaction. In cases where the thread or process 114 elects to commit the transaction, the transaction manager 112 responds by sending a prepare message to concurrent aspect 200. Due to the nature of shared bag 116 there are no pre-commit consistency checks for concurrent aspect 200 to perform. Therefore, concurrent aspect 200 responds to the prepare message by forwarding the transaction record 212 for the committing transaction to serial aspect 202.

Figure 7:
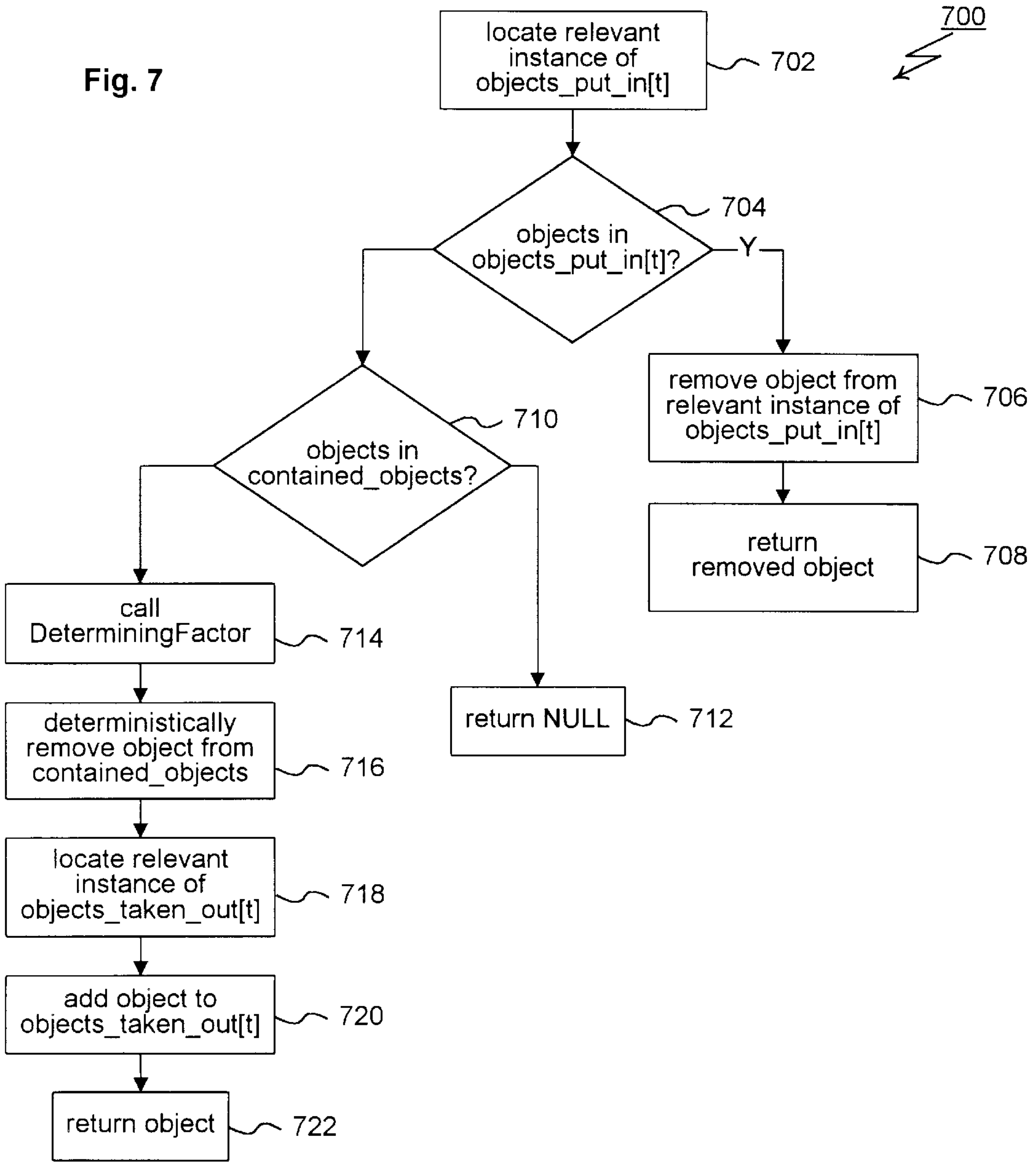
FIG. 7 is a flow chart showing the steps performed by the serial aspect during processing the TakeOut method of an embodiment of the present invention.

On receipt of transaction record 212, serial aspect 202 uses the contents of transaction record 212 to replay the transaction. This replay generally involves invoking methods 500 and 600 in the context of serial aspect 202 to invoke PutIn 404*a* and TakeOut 404*b*, For the replay, however, execution of method 600 is modified to use the information recorded by DeterminingFactor 404*c*. To illustrate this difference, execution of TakeOut 404*b* by serial aspect 202 is shown as method 700 of FIG. 7. As shown, method 700 is substantially similar to method 600. Method 600 and method 700 differ, however, in regard to steps 614 and 716. It may be recalled that, in step 614, concurrent aspect 200 removes an object from contained_objects 402*c*. The identity of the removed object is later recorded in transaction record 212 when DeterminingFactor 404*c* is called (see step 620). The recorded identity is then retrieved by serial aspect 202 in the corresponding DeterminingFactor 404*c* call made in step 714, and then used by serial aspect 202 in step 716 to deterministically remove the same object from contained_objects 402*c*. This ensures that the replay performed by serial aspect 202 matches the transaction performed by concurrent aspect 200.

Note that this difference in execution of method TakeOut 404*b* requires the ability to detect that TakeOut 404*b* is running in serial aspect 202. This information is available during execution and is used to conditionally call DeterminingFactor 404*c* prior to removing an object in steps 714 and 716. Conversely, when method TakeOut 404*b* executes in concurrent aspect 200, it is known that it is executing in concurrent aspect 200, and this information is used to conditionally call DeterminingFactor 404*c* after removing, nonselectively, an object from contained_objects 402*c*, in steps 614 and 620.

After replaying the transaction, serial aspect 202 commits the current transaction. To commit the transaction, serial aspect 202 moves each object included in the relevant objects_put_in[t]402*a* to contained_objects 402*c*. No action is taken with respect to objects_taken_out[t] 402*b*.These objects have already been removed from contained_objects 402*c*. Serial aspect 202 then sends a message to concurrent aspect 200 indicating that it has committed the transaction. Concurrent aspect 200 responds to the message from serial aspect 202 by sending a message to transaction manager 112 voting to commit the transaction.

After voting on the transaction, concurrent aspect 200 will receive another message from transaction manager 112. The message tells concurrent aspect 200 to commit or rollback the transaction. To respond to a message indicating that the transaction should commit, concurrent aspect 200 performs the same commit processing described for serial aspect 202. Namely, concurrent aspect 200 moves each object included in the relevant objects_put_in[t] 402*a* to contained_objects 402*c*.

To respond to a message to rollback the transaction, concurrent aspect 200 moves each object included in the relevant objects_taken_out[t]402*a* to contained_objects 402*c* of shared bag 116. No action needs to be taken with regard to the objects included in objects_put_in[t] 402*a*. This per-transaction list is discarded. Concurrent aspect 200 also forwards the rollback message to serial aspect 202 so that serial aspect 202 may perform rollback processing.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A shared bag implemented as a process pair resource manager used in object oriented programming and intended to provide multiple transactions with concurrent access to the shared bag in order to add or remove objects from the shared bag, the shared bag comprising:

a concurrent aspect configured to provide access to the objects managed by the shared bag during one or more concurrent transactions, thereby allowing the one or more concurrent transactions to add or remove objects from the shared bag in a concurrent fashion, the concurrent aspect configured to construct a transaction record for each respective transaction, wherein each transaction record includes each request message received by the concurrent aspect and each response message sent by the concurrent aspect during a particular transaction pertaining to the objects added to or removed from the shared bag during the particular transaction; and a serial aspect for committing or rolling back a transaction, configured to serially replay each transaction in the one or more concurrent transactions after each transaction has been completed by the concurrent aspect.

2. A shared bag as recited in claim 1, wherein the concurrent aspect and serial aspect each include methods for adding objects to the shared bag and for removing objects from the shared bag.

3. A shared bag as recited in claim 1, wherein the concurrent aspect includes a method for recording the identity of each object removed during a transaction to allow the serial aspect to deterministically remove the same object during the replay of the same transaction.

4. A shared bag as recited in claim 1 further comprising a transaction record log, wherein the concurrent aspect is configured to respond to a prepare message received from a transaction manager; by adding the transaction record corresponding to a completed transaction to a transaction record log before the serial aspect begins to serially replay the transaction.

5. A shared bag as recited in claim 1, wherein the concurrent aspect is configured to respond to a prepare message received from a transaction manager by forwarding the transaction record corresponding to the prepare message to the serial aspect with the receipt of the transaction record acting as an implicit prepare message to the serial aspect.

6. A shared bag as recited in claim 1 wherein the concurrent aspect is configured to rollback a transaction by undoing the effects of the transaction within the memory of the concurrent aspect.

7. A shared bag as recited in claim 1 further comprising a passivated serial image, the passivated serial image including information usable to reconstruct the serial image in a between-transaction state.

8. A shared bag as recited in claim 7 wherein the serial aspect is configured to rollback a transaction by aborting and recovering using the passivated serial image and transaction record log.

9. A shared bag as recited in claim 7 wherein the serial aspect is configured to restart after system failure, and to then recover its state using the passivated serial image and transaction record log.

10. A shared bag as recited in claim 9 which, following recovery, assumes the role of the concurrent aspect.

11. A method for providing access to a shared bag, the method comprising the steps, performed by a computer system, of:

providing a plurality of transactions with concurrent access to a shared bag by using a concurrent aspect;

constructing one or more transaction records, each transaction record corresponding to a particular transaction in the plurality of transactions, wherein each transaction record includes each request received by the concurrent aspect during the particular transaction corresponding to that transaction record, and each response message sent by the concurrent aspect during the particular transaction corresponding to that transaction record; and replaying in sequence, by a serial aspect for committing or rolling back a transaction, each transaction in the one or more concurrent transactions after each transaction has been completed by the concurrent aspect.

12. A method as recited in claim 11 further comprising the step, performed by the concurrent aspect, of registering with a transaction manager.

13. A method as recited in claim 11 further comprising the steps, performed by the concurrent aspect, of:

receiving a prepare message from a transaction manager, the prepare message corresponding to a particular transaction; and adding the transaction record corresponding to the particular transaction to a transaction record log.

14. A method as recited in claim 11 further comprising the steps, performed by the concurrent aspect, of:

receiving a prepare message from a transaction manager, the prepare message corresponding to a particular transaction; and forwarding the transaction record corresponding to the particular transaction to the serial aspect, receipt of the transaction record acting as an implicit prepare message to the serial aspect.

15. A method as recited in claim 11 further comprising the step, performed by the concurrent aspect, of rolling back a transaction by undoing the effects of the transaction within the memory of the concurrent aspect.

16. A method as recited in claim 11 further comprising the step, performed by the serial aspect, of constructing a passivated serial image, the passivated serial image including information usable to reconstruct the serial image in a between-transaction state.

17. A method as recited in claim 16 further comprising the steps, performed by the serial aspect, of:

aborting the serial aspect;

creating a new serial aspect using the passivated serial image; and replaying each transaction included in the transaction record log.

18. A method as recited in claim 11 further comprising the step, performed by the concurrent aspect, of recording the identity of each object removed during a particular transaction in the transaction record corresponding to the transaction.

19. A method as recited in claim 18 further comprising the step, performed by the serial aspect, of using the identity recorded in the transaction record to deterministically remove an object during the replay of the transaction corresponding to the transaction record.

20. A computer program product comprising:

a computer usable medium having computer readable code embodied therein for providing a shared bag for use in a computer system, the computer program product comprising:

a concurrent aspect including computer readable program code devices configured to cause a computer to provide access to a shared bag during one or more concurrent transactions, the concurrent aspect also including computer readable program code devices configured to cause a computer to construct a transaction record including each request message received by the concurrent aspect and each response message sent by the concurrent aspect during a particular transaction; and a serial aspect for committing or rolling back a transaction including computer readable program code devices configured to cause a computer to serially replay the transactions in which the concurrent aspect participates.

21. A computer program product as recited in claim 20 wherein the concurrent aspect includes computer readable program code devices configured to cause a computer to register the concurrent aspect with transaction managers as part of a two-phase commit protocol.

22. A computer program product as recited in claim 20, wherein the concurrent aspect includes computer readable program code devices configured to cause a computer to:

receive a prepare message from a transaction manager, the prepare message corresponding to a particular transaction; and add the transaction record corresponding to the particular transaction to a transaction record log.

23. A computer program product as recited in claim 20, wherein the concurrent aspect includes computer readable program code devices configured to cause a computer to:

receive a prepare message from a transaction manager, the prepare message corresponding to a particular transaction; and forward the transaction record corresponding to the particular transaction to the serial aspect, receipt of the transaction record acting as an implicit prepare message to the serial aspect.

24. A computer program product as recited in claim 20 wherein the concurrent aspect includes computer readable program code devices configured to cause a computer rollback a transaction within the concurrent aspect by undoing the effects of the transaction within the memory of the concurrent aspect.

25. A computer program product as recited in claim 20, wherein the serial aspect includes computer readable program code devices configured to cause a computer to construct a passivated serial image, the passivated serial image including information usable to reconstruct the serial image in a between-transaction state.

26. A computer program product as recited in claim 25 wherein the serial aspect includes computer readable program code devices configured to cause a computer rollback a transaction within the serial aspect by aborting the serial aspect, creating a new serial aspect using the passivated serial image, and replaying each transaction included in the transaction record log.

27. A computer program product as recited in claim 20, wherein the concurrent aspect includes computer readable program code devices configured to cause a computer to record the identity of each object removed during a particular transaction in the transaction record corresponding to the transaction.

28. A computer program product as recited in claim 27, wherein the serial aspect includes computer readable program code devices configured to cause a computer to use the identity recorded in the transaction record to deterministically remove an object during the replay of the transaction corresponding to the transaction record.

29. A shared bag as recited in claim 1, wherein the shared bag is an object being implemented as a process-pair resource manager intended to provide concurrent access to multiple threads.

30. A computer program product comprising:

a computer readable medium having computer readable code embodied therein for causing multiple transactions in an object-oriented programming environment to be concurrently processed by:

collecting a plurality of objects in a shared bag having a concurrent aspect and a serial aspect;

providing the multiple transactions with concurrent access to the concurrent aspect of the shared bag, thereby allowing each of the multiple transactions to request that objects be non-deterministically added to or removed from the shared bag;

maintaining a transaction record for each of the multiple transactions, wherein the transaction record includes a plurality of request messages received by the concurrent aspect during the transaction corresponding to that transaction record and a plurality of response messages sent by the concurrent aspect during the transaction corresponding to that transaction record, with each response message identifying the object added to or removed from the shared bag in response to each request message;

forwarding the transaction record for a particular transaction to the serial aspect once the particular transaction has been completed by the concurrent aspect; and replaying in sequence, by the serial aspect, each request message and response message in the transaction record for the particular transaction in order to commit or roll back the particular transaction.

31. The computer program product of claim 30, wherein the computer readable medium having computer readable code embodied therein for causing multiple transactions in an object-oriented programming environment to be concurrently processed by:

causing the serial aspect to send a message to the concurrent aspect instructing the concurrent aspect to roll back a transaction, thereby undoing any effects of the transaction on the shared bag, if the serial aspect is unable to replay each request message and response message.

32. A computer readable program storage device, tangibly embodying a computer program of executable instructions for causing multiple transactions in an object-oriented programming environment to be concurrently processed by performing the steps of:

collecting a plurality of objects in a shared bag having a concurrent aspect and a serial aspect;

providing the multiple transactions with concurrent access to the concurrent aspect of the shared bag, thereby allowing each of the multiple transactions to request that objects be non-deterministically added to or removed from the shared bag;

maintaining a transaction record for each of the multiple transactions, wherein the transaction record includes a plurality of request messages received by the concurrent aspect during a particular transaction corresponding to that transaction record and a plurality of response messages sent by the concurrent aspect during the particular transaction corresponding to that transaction record, with each response message identifying the object added to or removed from the shared bag in response to each request message; and forwarding the transaction record for a particular transaction to the serial aspect once the particular transaction has been completed by the concurrent aspect;

replaying in sequence, by the serial aspect, each request message and response message the transaction record for the particular transaction in order to commit or roll back the particular transaction.

33. The computer readable program storage device of claim 32 wherein the computer program of executable instructions cause multiple transactions in an object-oriented programming environment to be concurrently processed by performing the further step of:

sending a message from the serial aspect to the concurrent aspect, instructing the concurrent aspect to roll back a transaction, thereby undoing any effects of the transaction on the shared bag, if the serial aspect is unable to replay each request message and response message.

* * * * *

UNITED STATES PATENT AND TRADEMARK OFFICE

CERTIFICATE OF CORRECTION

PATENT NO. : 6,128,615

DATED : October 3, 2000

INVENTOR(S) : Molley et al.

It is certified that error appears in the above-identified patent and that said Letters Patent is hereby corrected as shown below:

On Page 8, in claim 4, line [58] after "manager" insert --,--.

On Page 12, in claim 32,line [41] after "message" insert –in--.

Signed and Sealed this

Eighth Day of May, 2001

*Attest:*

Nicholas P. Godici

NICHOLAS P. GODICI

*Attesting Officer*

*Acting Director of the United States Patent and Trademark Office*